United States Patent
Zhou (10) Patent No.: US 10,440,345 B2
(45) Date of Patent: Oct. 8, 2019

(54) DISPLAY CONTROL METHODS AND APPARATUSES

(71) Applicant: BEIJING ZHIGU RUI TUO TECH CO., LTD., Beijing (CN)

(72) Inventor: Liang Zhou, Beijing (CN)

(73) Assignee: BEIJING ZHIGU RUI TUO TECH CO., LTD., Beijing (CN)

(*) Notice: Subject to any disclaimer, the term of this patent is extended or adjusted under 35 U.S.C. 154(b) by 38 days.

(21) Appl. No.: 15/556,245

(22) PCT Filed: Mar. 4, 2016

(86) PCT No.: PCT/CN2016/075560
§ 371 (c)(1),
(2) Date: Sep. 6, 2017

(87) PCT Pub. No.: WO2016/141851
PCT Pub. Date: Sep. 15, 2016

(65) Prior Publication Data
US 2018/0249147 A1 Aug. 30, 2018

(30) Foreign Application Priority Data
Mar. 12, 2015 (CN) .......................... 2015 1 0107812

(51) Int. Cl.
*H04N 13/167* (2018.01)
*H04N 19/597* (2014.01)
(Continued)

(52) U.S. Cl.
CPC ......... *H04N 13/167* (2018.05); *H04N 13/139* (2018.05); *H04N 13/307* (2018.05);
(Continued)

(58) Field of Classification Search
CPC .......................... H04N 13/167; H04N 19/597
See application file for complete search history.

(56) References Cited

U.S. PATENT DOCUMENTS

| 2007/0229653 | A1 | 10/2007 | Matusik et al. |
| 2014/0035959 | A1* | 2/2014 | Lapstun ................ G02B 26/10 345/690 |

(Continued)

FOREIGN PATENT DOCUMENTS

| CN | 101411207 A | 4/2009 |
| CN | 103777432 A | 5/2014 |

(Continued)

OTHER PUBLICATIONS

International Search Report and Written Opinion for Application No. PCT/CN2016/075560, dated Jun. 3, 2016, 8 pages.
(Continued)

*Primary Examiner* — Girumsew Wendmagegn
(74) *Attorney, Agent, or Firm* — Sheppard Mullin Richter & Hampton LLP (57) ABSTRACT

Embodiments of the present application disclose various display control methods and apparatuses. One of the display control methods comprises: determining a first display area of a first light field display device and play sequence alignment reference information, wherein the first display area is used to play a first video; and controlling, according to the play sequence alignment reference information, a second display device to display, within at least one first frame interval of the first video, at least one second frame of a second video in the first display area, wherein the first video and the second video are different parts obtained by performing time-domain downsampling of a same content source. This solution can improve a gain of a time resolution actually displayed in a light field information content source, and improve the flexibility of time-domain display control.

34 Claims, 6 Drawing Sheets

(51) Int. Cl.
  *H04N 13/332*   (2018.01)
  *H04N 13/139*   (2018.01)
  *H04N 13/363*   (2018.01)
  *H04N 13/307*   (2018.01)
  *H04N 13/00*    (2018.01)

(52) U.S. Cl.
  CPC ......... *H04N 13/332* (2018.05); *H04N 13/363* (2018.05); *H04N 19/597* (2014.11); *H04N 2013/0096* (2013.01)

(56) References Cited

U.S. PATENT DOCUMENTS

| | | |
|---|---|---|
| 2014/0340390 A1 | 11/2014 | Lanman et al. |
| 2014/0340490 A1 | 11/2014 | Duffy et al. |
| 2017/0075418 A1 | 3/2017 | Zhou et al. |
| 2017/0076475 A1 | 3/2017 | Zhou |

FOREIGN PATENT DOCUMENTS

| | | |
|---|---|---|
| CN | 103927005 A | 7/2014 |
| CN | 103927966 A | 7/2014 |
| CN | 103995356 A | 8/2014 |
| WO | 2013/188464 A1 | 12/2013 |
| WO | 2015/023455 A1 | 2/2015 |

OTHER PUBLICATIONS

Balogh et al., "The Holovizio System—New Opportunity Offered by 3D Displays," Proceedings of the TMCE, 2008, 11 pages.
Lanman, D. et al., "Near-Eye Light Field Displays," NVIDIA Research, ACM Transactions on Graphics, 2013, 10 pages.
Maimone, A. et al., "Focus 3D: Compressive Accommodation Display," ACM Transactions on Graphics, 2013, vol. VV, No. N, 12 pages.

* cited by examiner

DISPLAY CONTROL METHODS AND APPARATUSES

CROSS-REFERENCE TO RELATED APPLICATIONS

This application is a National Phase Application of International Application No. PCT/CN2016/075560, filed on Mar. 4, 2016, which claims priority to and benefit of Chinese Patent Application No. 201510107812.0, filed on Mar. 12, 2015, and entitled "Display Control Methods and Apparatuses". Both of the above-referenced applications are incorporated into the present application by reference herein in their entirety.

TECHNICAL FIELD

The present application relates to the field of display technologies, and in particular, to various display control methods and apparatuses.

BACKGROUND

The light field display technology may use a relatively flexible display effect by means of a hardware structure similar to that of the traditional display technology. For example, light field 3D display, light field projection display, light field near-to-eye display on a wearable device, vision correction of light field display or the like draw increasingly common attention from researchers in recent years.

To some extent, the light field display technology may be regarded as a 3D display technology that falls in between the traditional binocular stereoscopic display technology and the holographic display technology. The light field display technology may present multi-view information compared with the traditional binocular stereoscopic display technology, need to process less data compared with the holographic display technology, but need to process data many times more than the binocular stereoscopic display technology. Therefore, certain performance trade-off may be taken into account in designing a light field display system. For example, light field information may be displayed at a lower frame rate so as to reduce a total data size required to be processed for playing contents. However, in some scenarios, display at a lower frame rate may cause streaking or jumping of a display frame, thus having an adverse impact on a user's viewing effect.

SUMMARY

A brief summary about the present application is given hereinafter, so as to provide a basic understanding about certain aspects of the present application. It should be understood that the summary is not an exhaustive summary about the present application. It is neither intended to determine critical or important parts of the present application, nor intended to limit the scope of the present application. Its purpose is merely giving some concepts in a simplified form, to be taken as the preamble to be described later in more detail.

Embodiments of the present application provide various display control methods and apparatuses.

According to one aspect, an embodiment of the present application provides a display control method, comprising:
determining a first display area of a first light field display device and play sequence alignment reference information, wherein the first display area is used to play a first video; and
controlling, according to the play sequence alignment reference information, a second display device to display, within at least one first frame interval of the first video, at least one second frame of a second video in the first display area, wherein the first video and the second video are different parts obtained by performing time-domain downsampling of a same content source.

According to another aspect, an embodiment of the present application provides a display control apparatus, comprising:
an information determining module, configured to determine a first display area of a first light field display device and play sequence alignment reference information, wherein the first display area is used to play a first video; and
a display control module, configured to control, according to the play sequence alignment reference information, a second display device to display, within at least one first frame interval of the first video, at least one second frame of a second video in the first display area, wherein the first video and the second video are different parts obtained by performing time-domain downsampling of a same content source.

In the technical solution provided in the embodiments of the present application, a time-division joint display of a first video and a second video obtained by differently downsampling a same content source from a time-domain dimension is respectively performed by means of the first light field display device and the second display device. When display control is performed, the second display device is controlled to interpolate and display, within at least one first frame interval of the first video, at least one second frame of the second video according to play sequence reference information, and an area displayed by the second frame is the first display area of the first video. In this way, other parts of the same content source are displayed, by the second display device, in a time-domain stagger interpolation frame of the first display area, to cause that the first video displayed by the first light field display device is superimposed, in the time domain, with the second video displayed by the second display device, thereby improving the gain of the time resolution actually displayed in the light field information content source and improving the flexibility in time-domain display control without increasing a data calculation quantity of the first light field display device, which may facilitate improving a video viewing effect of the first display area for a user.

These and other advantages of the present application will be more evident through the following detailed description about optional embodiments of the present application with reference to the accompanying drawings.

BRIEF DESCRIPTION OF THE DRAWINGS

The present application can be better understood with reference to the description given below in combination with the accompanying drawings, in which the same or similar reference signs are used in all the drawings to indicate the same or similar components. The drawings together with the following detailed description are comprised in the specification and form a part of the specification, and are configured to further exemplify alternative embodiments of the present application and explain the principle and advantages of the present application. In the drawings.

Persons skilled in the art should understand that components in the accompanying drawings are shown merely for simpleness and clearness, and are not always drawn to scale. For example, sizes of some components may be amplified relative to other components, so as to facilitate enhancing the understanding of embodiments of the present application.

DETAILED DESCRIPTION

Exemplary embodiments of the present application are described below in detail with reference to the accompanying drawings. For the sake of clarity and simplicity, not all the features of actual implementations are described in the specification. However, it should be understood that, lots of decisions specific to implementations must be made during development of any such actual embodiment, so as to achieve specific goals of developers, for example, restrictions relevant to systems and services are met, and the restrictions may vary with different implementations. In addition, it should also be understood that, although development work is likely to be very complicated and time-consuming, for those skilled in the art who benefit from the disclosure, the development work is merely a routine task.

Herein, it should also be noted that, in order to avoid blurring the present application due to unnecessary details, only apparatus structures and/or processing steps closely related to solutions according to the present application are described in the accompanying drawings and the specification, but representation and description about members and processing having little to do with the present application and known to those of ordinary skill in the art are omitted.

Specific implementation manners of the present application are further described below in detail with reference to the accompanying drawings (in which like elements are denoted by like reference numerals) and embodiments. The following embodiments are used for describing the present application, but are not intended to limit the scope of the present application.

A person skilled in the art may understand that the terms such as "first" and "second" in the present application are used only to differentiate different steps, devices, modules, or the like, and neither represent any specific technical meaning, nor indicate any logical relationship between the terms.

Figure 1:
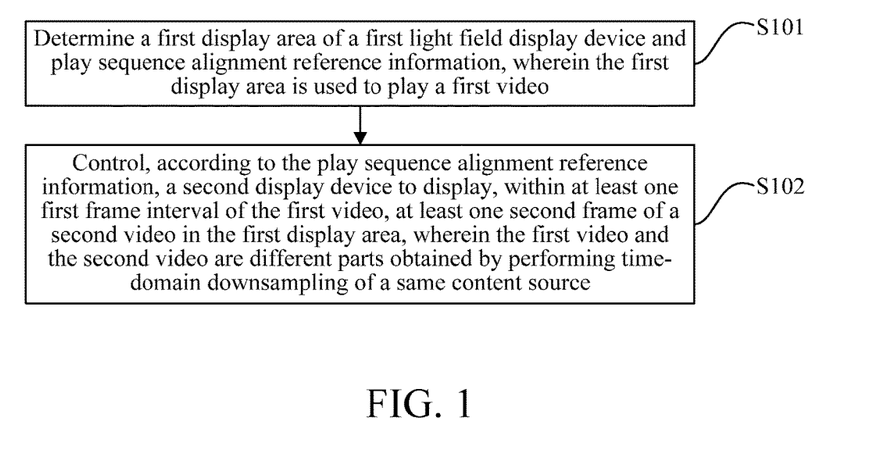
FIG. 1 is a flowchart of a display control method according to an embodiment of the present application.

FIG. 1 is a flowchart of a display control method according to an embodiment of the present application. The display control method provided by this embodiment of the present application may be executed by a display control apparatus. The implementation of the display control apparatus is not limited. For example, the display control apparatus may be an independent component that respectively cooperates and communicates with two display devices (for example, a first light field display device and a second display device); or the display control apparatus may be a functional module integrated into a display device, for example, into the second display device in the embodiments of the present application, which is not limited in the embodiments of the present application. Specifically, as shown in FIG. 1, a display control method according to an embodiment of the present application comprises:

S101: determine a first display area of a first light field display device and play sequence alignment reference information, wherein the first display area is used to play a first video.

The determining the first display area and the play sequence reference information may either be performed in the same step or be performed in different steps, which is not limited in the embodiments of the present application.

S102: control, according to the play sequence alignment reference information, a second display device to display, within at least one first frame interval of the first video, at least one second frame of a second video in the first display area, wherein the first video and the second video are different parts obtained by performing time-domain downsampling of a same content source.

For the convenience of description, a frame of the first video may be referred to as a first frame, and an interval between two consecutive frames of the first video may be referred to as a first frame interval. And a frame of the second video may be referred to as a second frame.

In the point of technological development trend, an image sensor capture capability of a light field capture device is superior to an image display capability of the light field display device, and the amount of light field information captured is much higher than that of light field information displayed, i.e., light field information capture capability is not matched with the display capability. Light field information display is quite large in data size to be processed and high in operational complexity. Therefore, the cost is very high if high-quality 3D image display is implemented by a single light field display device. However, in the solution in which low frame rate display is used by weighing factors such as cost and power consumption, the time resolution of the content actually displayed by the light field display device is not matched with that of the content source, which may affect the user's viewing effect in some scenarios.

By using the technical solution provided in the embodiments of the present application, the first video and the second video having different sampling results are respectively obtained by differently downsampling the same content source from a time-domain dimension, wherein the first video is displayed in the first light field display device, and the second video is displayed in the second display device.

When the technical solution provided in the embodiments of the present application is used for display control, a content displayed by the light field display device may be subjected to a supplementary time-division display, so as to improve the user's viewing effect. Specifically, the play sequence of the second video is aligned to that of the first video according to the play sequence reference information, at least one second frame of the second video is interpolated and displayed, within at least one first frame interval of the first video, and an area in which the second frame is displayed is the first display area of the first video. In this way, other parts of the same content source are displayed, by the second display device, in a time-domain stagger interpolation frame of the first display area, to cause that the first video displayed by the first light field display device is superimposed, in the time domain, with the second video displayed by the second display device, thereby improving the gain of the time resolution actually displayed in the light field information content source and improving the flexibility in time-domain display control without increasing the data calculation quantity of the first light field display device, which may facilitate improving a video viewing effect of the first display area for the user.

Figure 2:
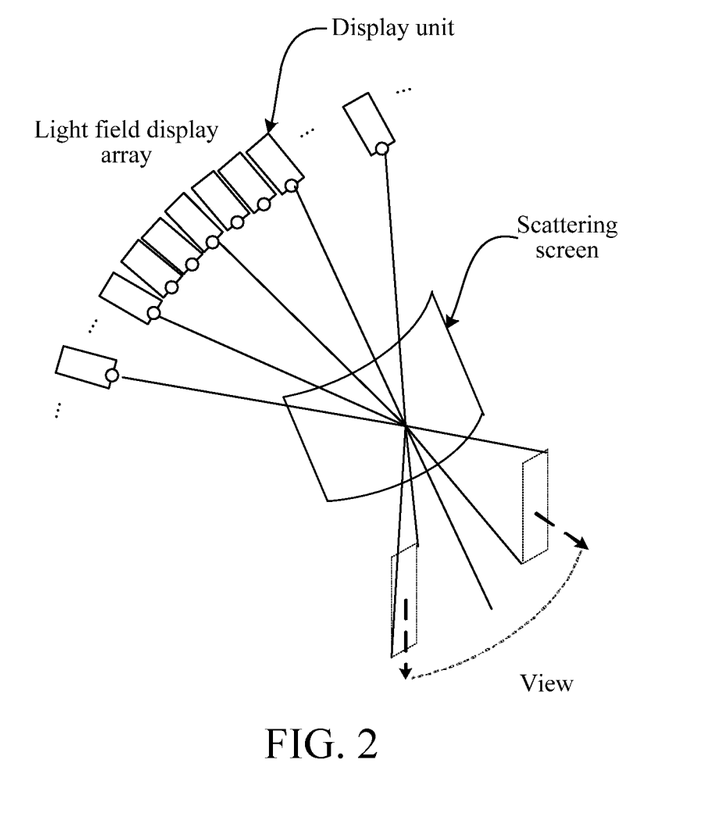
FIG. 2 is a structural schematic diagram of a light field display array according to an embodiment of the present application.

Optionally, the first light field display device is a light field display array. The light field display array may comprise N×M display units in an array distribution, wherein N is an integral number greater than or equal to 1, and M is an integral number greater than 1; or N is an integral number greater than 1, and M is an integral number greater than or equal to 1. Display units in the light field display array are isomorphic, or at least a part of the display units are isomeric. Array arrangement modes of display units may be determined according to actual demand for image display. For example, display units are in an array distribution on the same plane, or display units are in an array distribution on a cambered surface, etc. An optional structure of the light field display array as shown in FIG. 2, which comprises multiple display units arranged successively along a curve having a certain curvature. One display unit respectively displays a focused image (2D image) of a view of certain light field information, and different display units may display focused images of different views. In this way, focused images of various views respectively displayed by display units are displayed, in a superimposed way, in display space, which may restore the light field information to a certain extent, and implement a display effect where the user may see a superposed 3D image with naked eyes. One 2D image is equivalent to a static frame of a video, and multiple 2D images are played in a certain time sequence, which is equivalent to playing a video. The light field display array is configured to play the first display area of the first video, which may be but is not limited to an overall or local area covered by light ray transmitting in space which is given out by the display unit, in the light field display array, configured to play the first video. The light field display array may reduce, to a certain extent, the amount of data operation for light field information display by means of a design of an optical structure. However, when the light field is displayed on the basis of the light field display array, information of different views in the to-be-displayed light field is processed and synergistically displayed by display units corresponding to the views, the amount of data operation involved is still large, by weighing factors such as cost and power consumption or like, display frame rate of display units of the light field display array may be reduced, that is, the first video, after time-domain downsampling, whose time resolution is lower than the actual time resolution of the content source is displayed by means of the light field display array, and the time resolution of video display is compensated by means of a joint display on a time-domain of the second display device, thereby facilitating improving the display quality of the light field information.

Optionally, the second display device is a near-to-eye display device. The near-to-eye display device may be a traditional near-to-eye display device (for example, a pair of non-light field display see-through smart glasses or the like), or a near-to-eye light field display device (for example, a pair of see-through light field smart glasses or the like), which is not limited in the embodiments of the present application. When a user wears a near-to-eye display device to watch, the user's fundus imaging of the first video displayed by the first light field display device (for example, a light field display array or the like) and the user's fundus imaging of the second video displayed by the near-to-eye display device (for example, the see-through smart glasses or the like) are superposed in the time domain, thereby improving the display frame rate of the video actually watched by the user, and facilitating improving the viewing effect.

Optionally, before the controlling a second display device to display at least one second frame of a second video, the method further comprises: moving a position of the second display device and/or changing an optical projection parameter of the second display device, to cause that a focusing display area of the second display device is the first display area or in the first display area. The optical projection parameter may comprise but is not limited to: a refractive index and a focal distance of a lens, and a spacing between optical elements, etc. By means of change of the optical projection parameter of the second display device (for example, the near-to-eye display device), a corresponding frame of the second video is subjected to a time-division interpolation and display in the first display area where the first light field display device displays the first video. When the user watches the content displayed in the first display area, the users' fundus imaging of images respectively displayed by the two display devices is superposed in the time domain, to cause that the time resolution of the video actually watched by the user is increased slightly compared with the time resolution of the video separately displayed by the first light field display device, thereby improving the viewing effect.

Optionally, the time resolution of the first video is greater than or equal to that of the second video. In this case, the first light field display device may display the first video at a higher frame rate, the second display device performs a supplementary display, in the time domain, of the first video displayed by the first light field display device according to a characteristic of the display content, and the gain of the time resolution actually displayed is acquired by a time-division cooperation between both, thereby improving the flexibility in time-domain display control.

The play sequence alignment reference information is reference information configured to align the play sequences of the second video and the first video. Optionally, the play sequence alignment reference information comprises: play time information of the first video. The play time information of the first video may be a moment at which a certain frame (for example, a start frame or any an in-between or the like) of the first video is played, so as to facilitate the second display device aligning the play sequences of the second video. Further, the play time information of the first video may be relative time information on the first light field display device playing the first video. By processing, such as interacting and calibrating, the relative time information, the play sequence for playing, by the second display device, the second video is aligned to the play sequence for playing the first video. Alternatively, the play time information of the first video may comprise the absolute play time information of the first video, for example, an absolute play moment of the first video. Use of the solution of absolute moment alignment play sequence may facilitate reducing interaction, between the first light field display device and the second display device, of information required for aligning the play sequence.

The content source is a basis for sampling the first video and the second video. The content source may be predetermined, or be determined according to view information of the second display device relative to the first light field display device. For example, optionally, before the determining a first display area and play sequence alignment reference information, the display control method provided in the embodiments of the present application further comprises: determining view information of the second display device relative to the first light field display device; and determining the content source according to the view information. When the first light field display device displays the light field information, the view information of the light field information displayed by different display units may be different. The light field information comprises contents of multiple views. In some cases, the light field information, i.e., a content related to a view (may be regarded as the content source corresponding to the view) may be displayed by a display unit, that is, in the process of displaying the light field information, content sources corresponding to different views may be different. In the solution where the content source is determined according to the view information of the second display device relative to the first light field display device, the second display device performs a time-division supplementary display of the content corresponding to the view information of the light field information displayed by the first light field display device, which may facilitate pointedly improving the viewing effect of partial view of the light field information, and improving the flexibility in time-domain display control. Taking the light field display array as shown in FIG. 2 as an example, the content source of a view may be displayed by a display unit. A user may wear a pair of smart glasses and watch the content before a light field display array, and the content actually watched by the user is related to the view thereof relative to the light field display array. Therefore, the view information of a position of the smart glasses relative to a screen (the screen may be but is not limited to a scattering screen) of the light field display array can be determined, and it can be determined that the content source corresponding to the view information is the basis for time-domain sampling the first video and the second video. In this way, a time-division supplementary display of the content not displayed of the view of the light field display array is performed by means of the smart glasses, the user's fundus imaging of the view contents respectively displayed by the two display devices is superposed in a time-domain, to cause that the user may watch display content having higher time resolution, thereby improving the display quality and user experience.

For the sake of a differentiated description, in the embodiments of the present application, in order to acquire time-domain downsampling treatment of the content source by the first video, it may be referred to as first time-domain downsampling; in order to acquire time-domain downsampling treatment of the content source by the second video, it may be referred to as second time-domain downsampling. The first time-domain downsampling may be executed by the display control apparatus or the first light field display device, and the second time-domain downsampling may be executed by the display control apparatus or the second display device. The implementation manner is quite flexible.

Optionally, before the determining a first display area and play sequence alignment reference information, the display control method further comprises: obtaining the first video by performing first time-domain downsampling of the content source; and sending the first video to the first light field display device. The first video comprises a part of content, of the content source, downsampled in some way in a time-domain dimension, i.e., the time resolution of the first video acquired from sampling is lower than that of the content source. The first video acquired from sampling may be sent to the first light field display device for display. This solution may reduce the calculation quantity for the first light field display device in displaying the light field information, reduce the quantity of interaction and data transmission between the display control apparatus and the first light field display device, and facilitate the display control apparatus using a time-domain sampling manner different from the first video to determine the second video to be displayed by the second display device. Of course, the first video may also be obtained by the first light field display device by performing first time-domain downsampling of the content source, which is not limited in the embodiments of the present application.

Optionally, before the controlling a second display device to display at least one second frame of a second video, the method further comprises: obtaining the second video by performing second time-domain downsampling of the content source; and sending the second video to the second display device. The second video comprises a part of content, of the content source, downsampled in some way in a time-domain dimension, i.e., the time resolution of the second video acquired from sampling is lower than that of the content source. The second video obtained by performing second time-domain downsampling of the content source is different from the first video obtained by performing first time-domain downsampling of the content source, that is, the first video and the second video obtained by performing a time-domain downsampling comprise different parts of the same content source. The first video, of a certain view, displayed by the first light field display device and the second video displayed by the second display device are time-division complementary, so as to display more information of the content source, and improve the overall viewing effect, of the contents displayed by the two display devices, for the user. Of course, the second video may also be obtained by the second display device by performing second time-domain downsampling of the content source, which is not limited in the embodiments of the present application.

Figure 3:
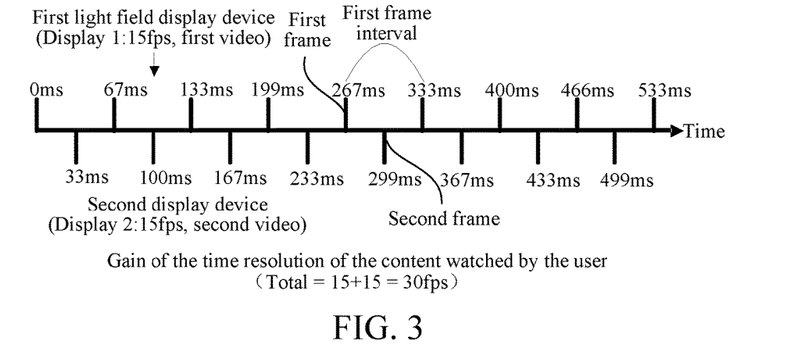
FIG. 3 is an optional application example I of display control according to an embodiment of the present application.

An optional application example is shown in FIG. 3, in which, time-domain downsampling may be performed, in different ways, on the content source corresponding to a certain view of the to-be-displayed light field information, so as to respectively obtain the first video to be displayed in the first light field display device and the second video to be displayed in the second display device. In the time domain, various first frames of the first video and various second frames of the second video are interlaced and distributed on a time axis. After the play sequence is aligned, within each first frame interval displayed by the first light field display device, the second display device displays a second frame. The users' fundus imaging of contents respectively displayed by the two display devices in the same display area is superposed in the time domain, which may be, from the perspective of the user's viewing effect, equivalent to a fact that the user watches a video having higher play frame rate. For example, the first light field display device plays the first video at a frame rate of 15 fps, and the second display device plays the second video at a frame rate of 15 fps, and the users' fundus imaging of contents respectively displayed by the two display devices in the same display area is superposed in the time domain, which may be equivalent to a fact that the user watches a video having a play frame rate of 30 fps.

In actual application, during the whole time period when the first light field display device plays the first video, a time-division supplementary display of the second video is performed by the second display device, and an optional example is shown in FIG. 3. Alternatively, during a partial time period when the first video is played, a time-division supplementary display of the second video is performed by the second display device according to the content nature of the content source. In this case, a second time-domain downsampling area in the content source is determined according to an image difference between adjacent frames in the first video; the second video is obtained by performing second time-domain downsampling of the second time-domain downsampling area; and the second video is sent to the second display device. In the process of playing the first video, the first video is played at a lower frame rate if the content thereof is involved with a motionless object or a scene that changes slightly or the like, which has less impact on the user's visual effect. However, if the content is involved with a moving object or a scene that changes greatly or the like, the overall or partial difference between the images of corresponding frames is generally larger. For this part of the contents, if it is still played at a lower frame rate, it may easily cause a visual effect such as streaking or jumping of a display frame, thus causing poorer user experience. By means of this solution, a time-domain downsampling may be performed on the second video according to the image difference between adjacent frames of the first video, so that the second display device may perform a time-domain interpolation frame supplementary display of a partial time period played in the first video, to cause that the user's fundus imaging of the contents respectively displayed by the two display devices within the time period is superposed in the time domain, thereby improving the time resolution of the video actually watched by the user, improving the display quality of the video actually watched by the user, and improving the user experience.

Figure 4:
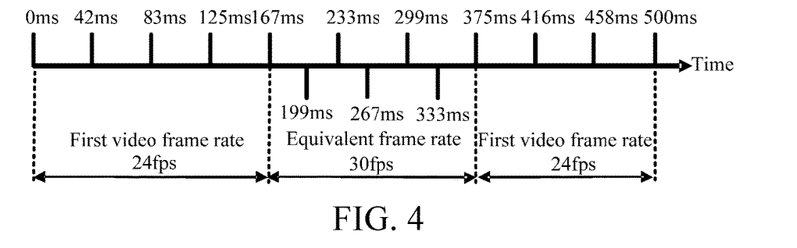
FIG. 4 is an optional application example II of display control according to an embodiment of the present application.

Optionally, the determining a second time-domain downsampling area in the content source according to an image difference between adjacent frames in the first video comprises: determining at least one time period where the image difference between adjacent frames in the first video satisfies a presupposed condition; and determining a part, of the content source, corresponding to the at least one time period as the second time-domain downsampling area. The presupposed condition may be flexibly determined according to the actual need, for example, the quantity of the pixel points, whose gray scale difference is not zero, in the overall or local area of two frames of images is a certain threshold value, etc. In this case, the gray scale difference of pixel points in the overall or local area of two adjacent frames of images in the first video is determined, the number of pixel points whose gray scale difference is not zero is counted, and the statistical result is compared with the threshold value. If the statistical result exceeds the threshold value, a part, of the content source, corresponding to the time period between the two adjacent frames may be incorporated into the second time-domain downsampling area, and the second video is obtained by performing second time-domain downsampling of the second time-domain downsampling area. An optional application example is shown in FIG. 4, in which, a part of time period (for example, 167 ms-375 ms) of the first video may be determined by means of image analysis or other means, the second video is obtained by performing second time-domain downsampling of a part, of the content source, corresponding to the part of time period, and various second frames of the second video and various first frames of the part of time period in the first video are interlaced and distributed. In this way, within the first frame interval when the first light field display device displays the part of time period, the second display device performs a time-division interpolation display of a second frame in the first display area, the user's fundus imaging of images displayed by the two display devices within the part of time period is superposed in the time domain, to cause that the frame rate at which the user views the content of the part of time period or the time resolution may be gained, thereby improving the viewing effect of the display content within the part of time period for the user. In this solution, by means of a time-division joint display control of a local time period, the user may experience the whole viewing effect of variable frame rate of different parts of the content source, for example, the frame rate of 0 ms-167 ms is 24 fps, the overall equivalent frame rate of 167 ms-375 ms is 24 fps, and the frame rate of 375 ms-500 ms is 24 fps. This achieves a targeted supplement to the display quality of the first light field display device at a low frame rate according to the content characteristic, thereby improving the viewing quality for the user and improving the user experience.

Figure 5:
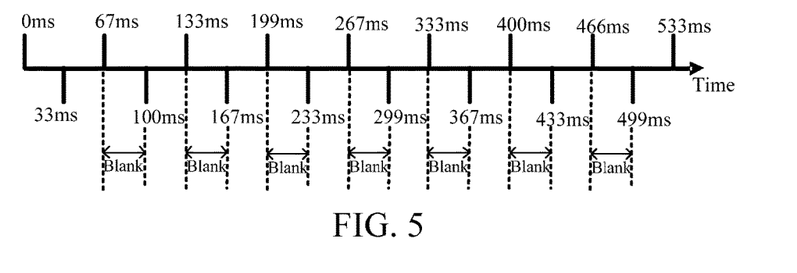
FIG. 5 is an optional application example III of display control according to an embodiment of the present application.
Figure 6:
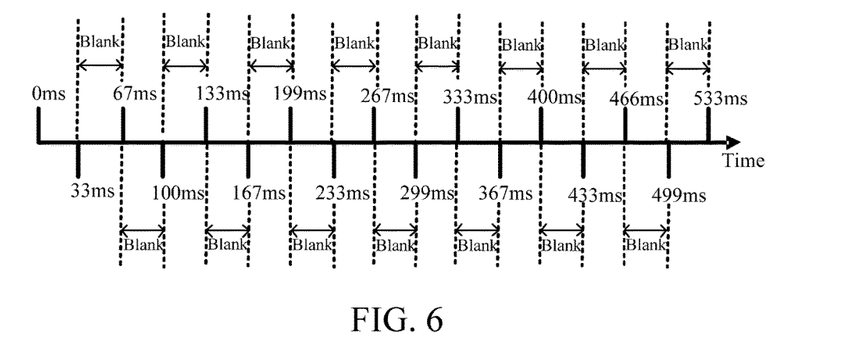
FIG. 6 is an optional application example IV of display control according to an embodiment of the present application.

In applications, a gain of the time resolution at which the content source is actually displayed can be achieved, so as to improve the video viewing effect by means of a reasonable design of the time-domain downsampling manner of the first video and the time-domain downsampling manner of the second video. Optionally, before the sending the second video to the second display device, the method further comprises: determining a second frame, within the first frame interval, in the second video obtained by downsampling; and replacing a part, in the determined second frame, since a corresponding moment of a next first frame is aligned with a blank frame. In this solution, by interpolation processing the blank frame of the second video obtained by time-domain downsampling, the visual effect for the user in viewing contents can be further improved, and the quantity of interaction and data transmission between the display control apparatus and the second display device can be reduced. For example, as shown in FIG. 5, parts, of the second video, since a corresponding moment of a next first frame is aligned in a second frame are replaced with a blank frame. For example, 67 ms-100 ms, 133 ms-167 ms, 199 ms-233 ms, 267 ms-299 ms, 333 ms-367 ms, 400 ms-433 ms or 466 ms-499 ms may be replaced with a blank frame. In this way, when display control is performed, a blank frame is immediately displayed when a second frame which is subjected to a time-division interpolation display by the second display device within a certain first frame interval (for example, 0 ms-67 ms) continues into a display moment (for example, 67 ms) of a next first frame, and display of the blank frame will continue into a display moment (for example, 100 ms) of a next second frame. By means of this solution, frequent on-off control of video display by the second display device can be avoided, and interference with normal display of the first video by the second frame which is subjected to a time-division interpolation display in the second video can be reduced, thereby further improving the visual effect for the user. Of course, contents of the first video may also be subjected to an interpolation processing of a blank frame. As shown in FIG. 6, a part (for example, 33 ms-67 ms), of the first video, since a corresponding moment of a next second frame is aligned in a first frame (for example, 0 ms) is replaced with a blank frame, thereby reducing interference which may be caused when the two display devices simultaneously display contents in the first display area, and further improving the visual effect for the user.

Figure 7:
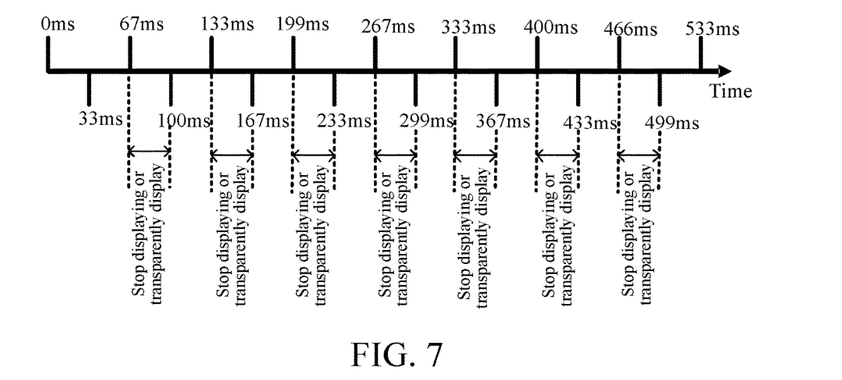
FIG. 7 is an optional application example V of display control according to an embodiment of the present application.

Optionally, the overall display effect may be improved by means of display control of the second display device. Specifically, after the controlling a second display device to display, within the first frame interval, at least one second frame of a second video, the method may further comprise: after it is controlled that a last frame in the at least one second frame within the first frame interval is displayed to a display moment aligned with a next first frame, transparently displaying or stopping displaying the last frame, or displaying a blank frame within the remaining display duration of the last frame. For example, as shown in FIG. 7, parts (for example, 33 ms-67 ms, 100 ms-133 ms, 167 ms-199 ms, 233 ms-267 ms, 299 ms-333 ms, 367 ms-400 ms and 433 ms-466 ms, etc.), of the second video, before a corresponding moment of a next first frame is aligned in a second frame can be displayed normally. Parts (for example, 67 ms-100 ms, 133 ms-167 ms, 199 ms-233 ms, 267 ms-299 ms, 333 ms-367 ms, 400 ms-433 ms and 466 ms-499 ms, etc.) since a corresponding moment of a next first frame is aligned in a second frame are stopped displaying, weakened in displaying or displayed as a blank frame. The weakening in displaying may comprise a full transparent display, or a semitransparent display or the like, thereby reducing interference with normal display of the first video by the second frame which is subjected to a time-division interpolation display in the second video, and further improving the visual effect for the user.

Optionally, frame contents of the second video obtained by time-domain downsampling may be locally replaced with a blank frame or performed by downsampling or other treatments, thereby achieving an effect of performing a pointedly time-division supplementary display according to the content characteristic by means of minor data size in interaction and display processing. Specifically speaking, before the sending the second video to the second display device, any display control method provided in the embodiments of the present application may further comprise: downsampling local image content of at least one second frame within the first frame interval and in the second video, or replacing the local image content with a blank, wherein other image contents not downsampled or not replaced with a blank are corresponding to an image content where the image difference between adjacent frames in the first video satisfies the presupposed condition. For example, in some cases, greatly-changed local image contents in adjacent frames of the first video can be determined, for example, in an image comprising a moving object and a background, if the background content in different frames of the first video changes slightly, but the moving object changes greatly, a local image content, excluding the moving object, in at least one second frame of the second video within the first frame interval of the foregoing adjacent frames is downsampled or replaced with a blank. In this way, in the second frame which is subjected to a time-division interpolation display in the second video by the second display device, only an image of the moving object is displayed, or the moving object (having a higher display resolution) and the background part (having a lower display resolution) are displayed at a differentiated resolution. In this solution, image contents of the second frame which is subjected to a time-division supplementary interpolation display are locally display selectively. This achieves a targeted supplement to the display quality of the first light field display device at a low frame rate according to the content characteristic, and a data size required for interacting and processing for supplementary display by the second display device can be effectively reduced.

A person skilled in the art may understand that in any one of the foregoing methods of the specific implementation manners of the present application, the value of the serial number of each step does not mean an execution sequence, and the execution sequence of each step should be determined according to the function and internal logic thereof, and should not be any limitation on the implementation procedure of the specific implementation manners of the present application.

Figure 8:
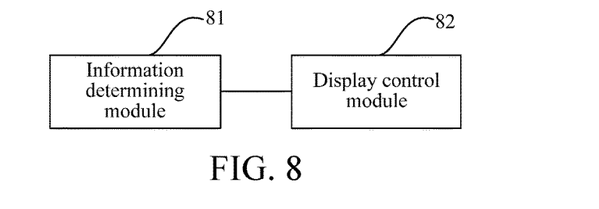
FIG. 8 is a logic block diagram of a display control apparatus according to an embodiment of the present application.

FIG. 8 is a logic block diagram of a display control apparatus according to an embodiment of the present application. As shown in FIG. 8, the display control apparatus provided by this embodiment comprises: an information determining module 81 and a display control module 82.

The information determining module 81 is configured to determine a first display area of a first light field display device and play sequence alignment reference information, wherein the first display area is used to play a first video. Optionally, the first light field display device is a light field display array.

The display control module 82 is configured to control, according to the play sequence alignment reference information, a second display device to display, within at least one first frame interval of the first video, at least one second frame of a second video in the first display area, wherein the first video and the second video are different parts obtained by performing time-domain downsampling of a same content source. Optionally, the second display device is a near-to-eye display device, which may comprise but is not limited to a near-to-eye light field display device.

The implementation of the display control apparatus is not limited. For example, the display control apparatus may be an independent component that respectively cooperates and communicates with two display devices (for example, at least one first light field display device and at least one second display device); or the display control apparatus may be a functional module integrated into a display device, for example, into the second display device in the embodiments of the present application, When display control is performed by the display control apparatus, the play sequence of the second video may be aligned, according to the play sequence reference information, the play sequence of the first video, and at least one second frame of the second video is interpolated and displayed within at least one first frame interval of the first video, and the area in which the second frame is displayed in the first display area of the first video. In this way, other parts of the same content source are displayed, by the second display device, in a time-domain stagger interpolation frame of the first display area, to cause that the first video displayed by the first light field display device is superimposed, in the time domain, with the second video displayed by the second display device, thereby improving the gain of the time resolution actually displayed in the light field information content source and improving the flexibility in time-domain display control without increasing a data calculation quantity of the first light field display device, which may facilitate improving a video viewing effect of the first display area for a user.

Optionally, a time resolution of the first video is greater than or equal to that of the second video. In this solution, the second display device may perform, in the time domain, a supplementary display of the first video displayed by the first light field display device according to a characteristic of the display content, and the gain of the time resolution actually displayed is acquired by a time-division cooperation between both, thereby improving the flexibility in time-domain display control.

Optionally, the play sequence alignment reference information comprises: play time information of the first video; and the play time information of the first video may comprise but is not limited to absolute play time information of the first video. Use of the solution of absolute moment alignment play sequence may facilitate reducing interaction, between the first light field display device and the second display device, of information required for aligning the play sequence.

Figure 9:
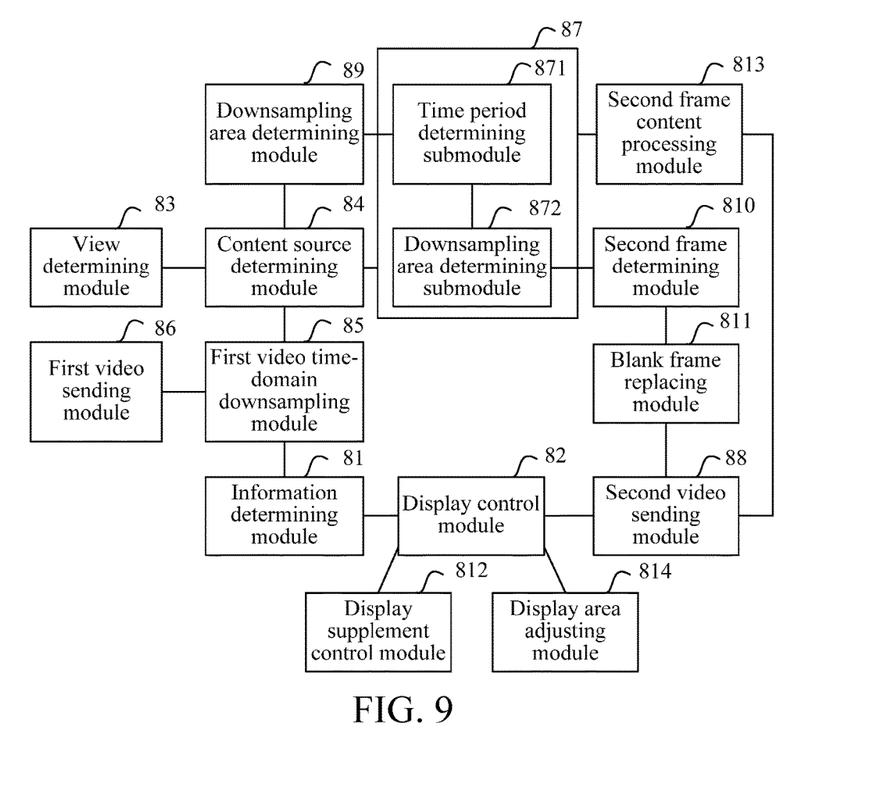
FIG. 9 is a logic block diagram of another display control apparatus according to an embodiment of the present application.

Optionally, as shown in FIG. 9, the display control apparatus may further comprise: a view determining module 83 and a content source determining module 84. The view determining module 83 is configured to determine view information of the second display device relative to the first light field display device; and the content source determining module 84 is configured to determine the content source according to the view information. In this solution, the content source is determined according to the view information of the second display device relative to the first light field display device, the second display device performs a time-division supplementary display of the content corresponding to the view information of the light field information displayed by the first light field display device, which may facilitate pointedly improving the viewing effect of partial view of the light field information, and improving the flexibility in time-domain display control.

Optionally, the display control apparatus may also comprise: a first video time-domain downsampling module 85 and first video sending module 86. The first video time-domain downsampling module 85 is configured to obtain the first video by performing first time-domain downsampling of the content source; and the first video sending module 86 is configured to send the first video to the first light field display device. This solution may reduce the calculation quantity for the first light field display device in displaying the light field information, reduce the quantity of interaction and data transmission between the display control apparatus and the first light field display device, and facilitate the display control apparatus using a time-domain sampling manner different from the first video to determine the second video to be displayed by the second display device.

Optionally, the display control apparatus may also comprise: a second video time-domain downsampling module 87 and second video sending module 88. The second video time-domain downsampling module 87 is configured to obtain the second video by performing second time-domain downsampling of the content source; and the second video sending module 88 is configured to send the second video to the second light field display device. The second time-domain downsampling manner is different from the first time-domain downsampling manner of the first video, that is, the first video and the second video obtained by performing a time-domain downsampling comprise different parts of the same content source. The first video, of a certain view, displayed by the first light field display device and the second video displayed by the second display device are time-division complementary, so as to display more information of the content source, and improve the overall viewing effect, of the contents displayed by the two display devices, for the user.

Optionally, the display control apparatus may also comprise: a second video time-domain downsampling module 87, a second video sending module 88 and a downsampling area determining module 89. The downsampling area determining module 89 is configured to determine a second time-domain downsampling area in the content source according to an image difference between adjacent frames in the first video; the second video time-domain downsampling module 87 is configured to obtain the second video by performing second time-domain downsampling of the second time-domain downsampling area; and the second video sending module 88 is configured to send the second video to the second display device. Further, the downsampling area determining module 87 may comprise: a time period determining submodule 871 and a downsampling area determining submodule 872. The time period determining submodule 871 is configured to determine at least one time period where the image difference between adjacent frames in the first video satisfies a presupposed condition; and the downsampling area determining submodule 872 is configured to determine a part, of the content source, corresponding to the at least one time period as the second time-domain downsampling area. By means of this solution, a time-domain downsampling may be performed on the second video according to the image difference between adjacent frames of the first video, so that the second display device may perform a time-domain interpolation frame supplementary display of a partial time period played in the first video, to cause that the user's fundus imaging of the contents respectively displayed by the two display devices within the time period is subjected to a time-domain superposition, thereby improving the time resolution of the video actually watched by the user, improving the display quality of the video actually watched by the user, and improving the user experience.

Optionally, the display control apparatus may further comprise: a second frame determining module 810 and a blank frame replacing module 811. The second frame determining module 810 is configured to determine a second frame, within the first frame interval, in the second video obtained by downsampling; and the blank frame replacing module 811 is configured to replace a part, in the determined second frame, since a corresponding moment of a next first frame is aligned with a blank frame. In this solution, by interpolation processing the blank frame of the second video obtained by time-domain downsampling, the visual effect for the user in viewing contents can be further improved, and the quantity of interaction and data transmission between the display control apparatus and the second display device can be reduced.

Optionally, the display control apparatus further comprises: a display supplement control module 812. The display supplement control module 812 is configured to: after it is controlled that a last frame in the at least one second frame within the first frame interval is displayed to a display moment aligned with a next first frame, transparently display or stop displaying the last frame, or display a blank frame within the remaining display duration of the last frame. By means of this solution, interference with normal display of the first video by the second frame which is subjected to a time-division interpolation display in the second video can be reduced, thereby further improving the visual effect for the user.

Optionally, the display control apparatus further comprises: a second frame content processing module 813. The second frame content processing module 813 is configured to perform downsampling of local image content of at least one second frame within the first frame interval and in the second video, or replace the local image content with a blank, wherein other image contents not downsampled or not replaced with a blank are corresponding to an image content where the image difference between adjacent frames in the first video satisfies a presupposed condition. By means of this solution, frame contents of the second video obtained by time-domain downsampling may be locally replaced with a blank frame or performed by downsampling or other treatments, thereby achieving an effect of performing a pointedly time-division supplementary display according to the content characteristic by means of minor data size in interaction and display processing. Optionally, the display control apparatus further comprises: a display area adjusting module 814. The display area adjusting module 814 is configured to move a position of the second display device and/or change an optical projection parameter of the second display device, to cause that a focusing display area of the second display device is the first display area or in the first display area. In this solution, by adjusting the second display device, the second display device may display the second video in the same or local display area (i.e., the first display area, or a local area in the first display area) where the first light field display device displays the first video, thereby facilitating the user watching superposition of time-division display contents displayed by the two display devices, improving the time resolution of the content actually watched, and improving the viewing effect.

Figure 10:
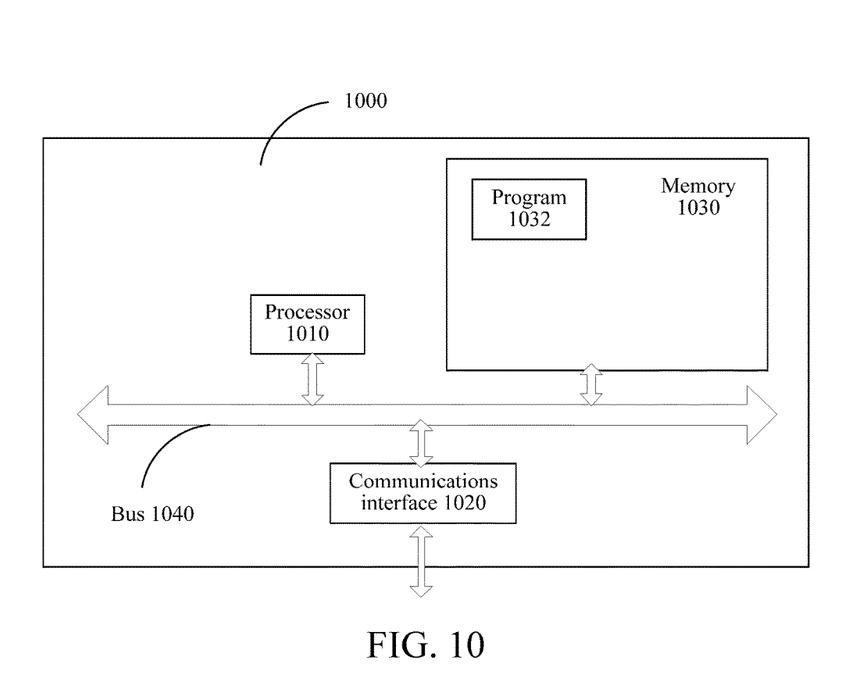
FIG. 10 is a logic block diagram of still another display control apparatus according to an embodiment of the present application.

FIG. 10 is a structural block diagram of another display control apparatus according to an embodiment of the present application. However, this specific embodiment of the present application does not limit a specific implementation manner of the display control apparatus 1000. As shown in FIG. 10, the display control apparatus 1000 may be a computer system, which comprises:

a processor 1010, a communications interface 1020, a memory 1030, and a communications bus 1040.

The processor 1010, the communications interface 1020, and the memory 1030 communicate with each other via the communications bus 1040.

The communications interface 520 is configured to communicate with, for example, a device having a communications function, an external light source or the like.

The processor 1010 is configured to run a program 1032, and specifically can perform the related steps in any one of the foregoing embodiments of the display control method.

For example, the program 1032 may comprise program code, where the program code comprises a computer operating instruction.

The processor 1010 may be a central processing unit (CPU), or an application specific integrated circuit (ASIC), or one or more integrated circuits configured to implement the embodiments of the present application.

The memory 1030 is configured to store the program 1032. The memory 1030 may comprise a random access memory (RAM), or further comprise a non-volatile memory, for example, at least one magnetic disk memory.

For example, in an optional implementation manner, the processor 1010 may run the program 1032 to perform the following steps: determining a first display area of a first optical field display device and play sequence alignment reference information, wherein the first display area is used to play a first video; and controlling, according to the play sequence alignment reference information, a second display device to display, within at least one first frame interval of the first video, at least one second frame of a second video in the first display area, wherein the first video and the second video are different parts obtained by performing time-domain downsampling of a same content source.

In other optional implementation manners, the processor 1010 may also run the program 1032 to perform the steps mentioned above in any one of the other embodiments, and details are not described herein again.

For the specific implementation of the steps in the program 1032, reference may be made to the corresponding descriptions in the corresponding steps or modules in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

Specific implementation of various steps in the program 1032 may refer to corresponding description of corresponding steps, modules, submodules and units in the foregoing embodiments, which is not repeated any more herein. Persons skilled in the art may clearly understand that for a convenient and concise description, a specific work process of devices and modules described above may refer to a corresponding process description of the foregoing method embodiments, which is not repeated any more herein.

In the various embodiments of the present application, the serial numbers and/or sequence numbers of the embodiments are merely for the convenience of description, and do not imply the preference among the embodiments. Particular emphasis is put on the description about each embodiment, and reference can be made to relevant description of other embodiments for the content not detailed in an embodiment. Reference can be made to the description about the corresponding method embodiments for related description about the implementation principle or process of relevant apparatus, device or system embodiments, which is not repeated herein.

A person of ordinary skill in the art may be aware that, units and method steps of the examples that are described in conjunction with the embodiments disclosed in this specification may be implemented by electronic hardware or a combination of computer software and electronic hardware. Whether the functions are performed by hardware or software depends on particular applications and design constraint conditions of the technical solution. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium and comprises several instructions for instructing a computer device (which may be a personal computer, a controller, a network device, or the like) to perform all or some of the steps of the methods described in the embodiments of the present application. The foregoing storage medium comprises: any medium that can store program code, such as a USB flash drive, a removable hard disk, a read-only memory (ROM), a random access memory (RAM), a magnetic disk, or an optical disc.

In the embodiments of the apparatus, method, and system of the present application, apparently, the parts (a system, a subsystem, a module, a sub-module, a unit, a subunit, and the like) or steps may be decomposed or combined, and/or decomposed first and then combined. These decomposition and/or combination should be considered as equivalent solutions of the present application. In the above descriptions of the specific embodiments of the present application, a feature described and/or shown for one implementation may be used in one or more of other implementations in the same or similar manner and combined with a feature in another implementation, or replace a feature in another implementation.

It should be emphasized that, terms "comprise/include" used herein refer to existence of a feature, an element, a step, or a component, but do not exclude existence or addition of one or more of other features, elements, steps, or components.

Finally, it should be noted that the foregoing implementation manners are merely used to describe the present application, but are not intended to limit the present application. A person of ordinary skill in the art may further make various variations and modifications without departing from the spirit and scope of the present application. Therefore, all the equivalent technical solutions also fall within the scope of the present application, and the patent protection scope of the present application should be subject to the claims.

What is claimed is:

1. A display control method, comprising:
   determining a first display area of a first light field display device and play sequence alignment reference information, wherein the first display area is for playing a first video; and
   controlling, according to the play sequence alignment reference information, a second display device to display, within at least one first frame interval of the first video, at least one second frame of a second video in the first display area, wherein the first video and the second video are different parts obtained by performing time-domain downsampling of a same content source.

2. The method of claim 1, wherein the first light field display device is a light field display array.

3. The method of claim 1, wherein the second display device is a near-to-eye display device.

4. The method of claim 3, wherein the near-to-eye display device is a near-to-eye light field display device.

5. The method of claim 1, wherein a time resolution of the first video is greater than or equal to that of the second video.

6. The method of claim 1, wherein the play sequence alignment reference information comprises: play time information of the first video.

7. The method of claim 6, wherein the play time information of the first video comprises: absolute play time information of the first video.

8. The method of claim 1, wherein before the determining a first display area and play sequence alignment reference information, the method further comprises:
   determining view information of the second display device relative to the first light field display device; and
   determining the content source according to the view information.

9. The method of claim 1, wherein, before the determining a first display area and play sequence alignment reference information, the method further comprises:
   obtaining the first video by performing first time-domain downsampling of the content source; and
   sending the first video to the first light field display device.

10. The method of claim 1, wherein before the controlling a second display device to display at least one second frame of a second video, the method further comprises:
    obtaining the second video by performing second time-domain downsampling of the content source; and
    sending the second video to the second display device.

11. The method of claim 10, wherein before the sending the second video to the second display device, the method further comprises:
    determining a second frame, within the first frame interval, in the second video obtained by downsampling; and
    replacing a part, in the determined second frame, since a corresponding moment of a next first frame is aligned with a blank frame.

12. The method of claim 1, wherein before the controlling a second display device to display at least one second frame of a second video, the method further comprises:
    determining a second time-domain downsampling area in the content source according to an image difference between adjacent frames in the first video; and
    obtaining the second video by performing second time-domain downsampling of the second time-domain downsampling area; and
    sending the second video to the second display device.

13. The method of claim 12, wherein the determining a second time-domain downsampling area in the content source comprises:
    determining at least one time period where the image difference between adjacent frames in the first video satisfies a presupposed condition; and
    determining a part, of the content source, corresponding to the at least one time period as the second time-domain downsampling area.

14. The method of claim 1, wherein after the controlling a second display device to display, within the first frame interval, at least one second frame of a second video, the method comprises:
    after it is controlled that a last frame in the at least one second frame within the first frame interval is displayed to a display moment aligned with a next first frame, transparently displaying or stopping displaying the last frame, or displaying a blank frame within the remaining display duration of the last frame.

15. The method of claim 1, wherein before the sending the second video to the second display device, the method further comprises:
    performing downsampling of a local image content of at least one second frame within the first frame interval and in the second video, or replacing the local image content with a blank, wherein other image contents not downsampled or not replaced with a blank are corresponding to an image content where the image difference between adjacent frames in the first video satisfies a presupposed condition.

16. The method of claim 1, wherein before the controlling a second display device to display, within at least one first frame interval of the first video, at least one second frame of a second video in the first display area, the method further comprises:

moving a position of the second display device and/or changing an optical projection parameter of the second display device, to cause that a focusing display area of the second display device is the first display area or in the first display area.

17. A display control apparatus, comprising:
an information determining module, configured to determine a first display area of a first light field display device and play sequence alignment reference information, wherein the first display area is for playing a first video; and
a display control module, configured to control, according to the play sequence alignment reference information, a second display device to display, within at least one first frame interval of the first video, at least one second frame of a second video in the first display area, wherein the first video and the second video are different parts obtained by performing time-domain downsampling of a same content source.

18. The apparatus of claim 17, wherein the first light field display device is a light field display array.

19. The apparatus of claim 17, wherein the second display device is a near-to-eye display device.

20. The apparatus of claim 19, wherein the near-to-eye display device is a near-to-eye light field display device.

21. The apparatus of claim 17, wherein a time resolution of the first video is greater than or equal to that of the second video.

22. The apparatus of claim 17, wherein the play sequence alignment reference information comprises: play time information of the first video.

23. The apparatus of claim 22, wherein the play time information of the first video comprises: absolute play time information of the first video.

24. The apparatus of claim 17, further comprising:
a view determining module, configured to determine view information of the second display device relative to the first light field display device; and
a content source determining module, configured to determine the content source according to the view information.

25. The apparatus of claim 17, further comprising:
a first video time-domain downsampling module, configured to obtain the first video by performing first time-domain downsampling of the content source; and
a first video sending module, configured to send the first video to the first light field display device.

26. The apparatus of claim 17, further comprising:
a second video time-domain downsampling module, configured to obtain the second video by performing second time-domain downsampling of the content source; and
a second video sending module, configured to send the second video to the second display device.

27. The apparatus of claim 26, further comprising:
a second frame determining module, configured to determine a second frame, within the first frame interval, in the second video obtained by downsampling; and
a blank frame replacing module, configured to replace a part, in the determined second frame, since a corresponding moment of a next first frame is aligned with a blank frame.

28. The apparatus of claim 17, further comprising:
a downsampling area determining module, configured to determine a second time-domain downsampling area in the content source according to an image difference between adjacent frames in the first video; and a second video time-domain downsampling module, configured to obtain the second video by performing second time-domain downsampling of the second time-domain downsampling area; and
a second video sending module, configured to send the second video to the second display device.

29. The apparatus of claim 28, wherein the downsampling area determining module comprises:
a time period determining submodule, configured to determine at least one time period where the image difference between adjacent frames in the first video satisfies a presupposed condition; and
a downsampling area determining submodule, configured to determine a part, of the content source, corresponding to the at least one time period as the second time-domain downsampling area.

30. The apparatus of claim 17, further comprising:
a display supplement control module, configured to: after it is controlled that a last frame in the at least one second frame within the first frame interval is displayed to a display moment aligned with a next first frame, transparently display or stop displaying the last frame, or display a blank frame within the remaining display duration of the last frame.

31. The apparatus of claim 17, further comprising:
a second frame content processing module, configured to perform downsampling of a local image content of at least one second frame within the first frame interval and in the second video, or replace the local image content with a blank, wherein other image contents not downsampled or not replaced with a blank are corresponding to an image content where the image difference between adjacent frames in the first video satisfies a presupposed condition.

32. The apparatus of claim 17, further comprising:
a display area adjusting module, configured to move a position of the second display device and/or change an optical projection parameter of the second display device, to cause that a focusing display area of the second display device is the first display area or in the first display area.

33. A non-transitory computer readable storage apparatus, comprising at least one executable instruction, which, in response to execution by a processor of a computer system, causes the computer system to perform a display control method, comprising:
determining a first display area of a first light field display device and play sequence alignment reference information, wherein the first display area is for playing a first video; and
controlling, according to the play sequence alignment reference information, a second display device to display, within at least one first frame interval of the first video, at least one second frame of a second video in the first display area, wherein the first video and the second video are different parts obtained by performing time-domain downsampling of a same content source.

34. A display control apparatus, comprising a processor and a memory, the memory storing computer executable instructions, the processor being connected to the memory through a communication bus, and when the apparatus for controlling task migration operates, the processor executing the computer executable instructions stored in the memory, causing the apparatus for controlling task migration to execute operations, comprising:

determining a first display area of a first light field display device and play sequence alignment reference information, wherein the first display area is for playing a first video; and controlling, according to the play sequence alignment reference information, a second display device to display, within at least one first frame interval of the first video, at least one second frame of a second video in the first display area, wherein the first video and the second video are different parts obtained by performing time-domain downsampling of a same content source.

* * * * *